(12) United States Patent
Freeman et al.

(10) Patent No.: US 10,562,508 B2
(45) Date of Patent: Feb. 18, 2020

(54) FREIGHT TRAILER BRAKE CLEARING SYSTEM

(71) Applicant: Intouch Shipping Technology, Ltd., Sun Prairie, WI (US)

(72) Inventors: Davis D. Freeman, Sun Prairie, WI (US); Logan Dillinger, Pittsburg, KS (US)

(73) Assignee: Intouch Shipping Technology, Ltd., Sun Prairie, WI (US)

( * ) Notice: Subject to any disclaimer, the term of this patent is extended or adjusted under 35 U.S.C. 154(b) by 8 days.

(21) Appl. No.: 15/660,428

(22) Filed: Jul. 26, 2017

(65) Prior Publication Data

US 2018/0029581 A1    Feb. 1, 2018

Related U.S. Application Data

(60) Provisional application No. 62/366,716, filed on Jul. 26, 2016.

(51) Int. Cl.
| | | |
|---|---|---|
| *B60T 13/40* | (2006.01) | |
| *B60T 13/66* | (2006.01) | |
| *B60T 17/00* | (2006.01) | |
| *B60T 17/06* | (2006.01) | |

(52) U.S. Cl.
CPC .......... *B60T 17/004* (2013.01); *B60T 13/403* (2013.01); *B60T 13/662* (2013.01); *B60T 17/06* (2013.01)

(58) Field of Classification Search
CPC ..... B60T 7/20; B60T 8/26; B60T 8/88; B60T 8/263; B60T 8/323; B60T 8/327; B60T 8/885; B60T 8/1887; B60T 11/34; B60T 17/22; B60T 17/18; B60T 2240/06; B60T 2270/406
USPC .......... 303/122.15, 9.63, 122.02, 123, 20, 7, 303/198; 410/119, 125
See application file for complete search history.

(56) References Cited

U.S. PATENT DOCUMENTS

| | | | | |
|---|---|---|---|---|
| 2,007,358 A | * | 7/1935 | Anger | F16K 31/0651 137/204 |
| 3,347,344 A | * | 10/1967 | Troy | F16D 65/827 188/264 R |
| 3,771,838 A | * | 11/1973 | Rossigno | B60T 13/58 303/7 |
| 3,971,596 A | | 7/1976 | Grix | |
| 3,982,698 A | | 9/1976 | Anderson | |
| 4,506,726 A | | 3/1985 | Tsai | |
| 4,541,392 A | | 9/1985 | Ogino | |

(Continued)

*Primary Examiner* — Robert A. Siconolfi
*Assistant Examiner* — San M Aung
(74) *Attorney, Agent, or Firm* — Dicke, Billig & Czaja PLLC

(57) ABSTRACT

A brake clearing system useful for clearing mechanical components of one or more brake units provided on a freight trailer having an air storage reservoir. The system includes a flow controller, at least one delivery hose, and at least one discharge device. The flow controller is fluidly between the air storage reservoir and the auxiliary tank. The delivery hose is fluidly connected to an outlet of the flow controller and delivers pressurized air to the discharge device. The discharge device, in turn, is configured to direct pressurized air at components of one of the brake units. The flow controller can include an inflow control unit, an auxiliary tank, and an outflow control unit. In related embodiments, the auxiliary tank can include a heater.

19 Claims, 5 Drawing Sheets

(56) References Cited

U.S. PATENT DOCUMENTS

| | | |
|---|---|---|
| 4,834,287 A | 5/1989 | Walsh et al. |
| 5,056,271 A | 10/1991 | Rose |
| 5,160,766 A | 11/1992 | Waltrip et al. |
| 5,315,479 A | 5/1994 | Bartilson |
| 5,469,597 A | 11/1995 | Page |
| 5,892,437 A | 4/1999 | Scheibe et al. |
| 5,924,774 A | 7/1999 | Cook et al. |
| 6,179,391 B1 | 1/2001 | Eberling et al. |
| 6,322,164 B1 | 11/2001 | Sakamoto et al. |
| 6,322,696 B1 | 11/2001 | Mckee et al. |
| 6,457,921 B1 | 10/2002 | Freeman |
| 6,609,767 B2 | 8/2003 | Mortenson et al. |
| 6,889,920 B2 | 5/2005 | Nance et al. |
| 6,910,722 B2 | 6/2005 | Takeda et al. |
| 7,099,764 B2 | 8/2006 | Seto et al. |
| RE39,422 E | 12/2006 | Clemons |
| 7,171,981 B2 | 2/2007 | Shade et al. |
| 7,229,138 B2 | 6/2007 | Nakamura et al. |
| 7,234,651 B2 | 6/2007 | Mousavi et al. |
| 7,306,078 B2 | 12/2007 | Fish |
| 7,360,718 B2 | 4/2008 | Yeh et al. |
| 7,478,888 B2 | 1/2009 | Woerner et al. |
| 7,550,105 B2 | 6/2009 | Scheid |
| 7,581,687 B2 | 9/2009 | Feith et al. |
| 7,686,235 B2 | 3/2010 | Roberts |
| 7,726,587 B2 | 6/2010 | Markley et al. |
| 7,765,859 B2 | 8/2010 | Connell et al. |
| 7,766,259 B2 | 8/2010 | Feith et al. |
| 8,038,229 B2 | 10/2011 | Leiber et al. |
| 8,152,204 B2 | 4/2012 | Pliassounov |
| 8,672,242 B2 | 3/2014 | Hunnicutt et al. |
| 8,701,697 B2 | 4/2014 | Radosevic |
| 8,733,165 B2 | 5/2014 | Hern et al. |
| 8,794,715 B2 | 8/2014 | Bennett et al. |
| 8,808,504 B2 | 8/2014 | Caspar |
| 8,827,378 B2 | 9/2014 | Toyohira et al. |
| 8,844,573 B2 | 9/2014 | Mann et al. |
| 8,911,030 B2 | 12/2014 | Ohnishi et al. |
| 8,920,078 B2 | 12/2014 | Woolever |
| 8,991,730 B2 | 3/2015 | Kah, Jr. et al. |
| 2006/0097569 A1* | 5/2006 | Eberling ............... B60T 8/323 303/122.15 |
| 2007/0063582 A1* | 3/2007 | Bryar ............... B60R 25/08 303/123 |
| 2009/0273232 A1* | 11/2009 | Barlsen ............... B60T 7/20 303/198 |
| 2012/0319463 A1* | 12/2012 | Lloyd ............... B60T 1/10 303/3 |
| 2014/0116812 A1* | 5/2014 | Simpson ............... B60R 25/08 188/1.11 R |
| 2016/0152216 A1* | 6/2016 | Spath ............... B60T 8/1708 701/70 |
| 2017/0174197 A1* | 6/2017 | Eberling ............... B60T 7/20 |

\* cited by examiner

FREIGHT TRAILER BRAKE CLEARING SYSTEM

CROSS-REFERENCE TO RELATED APPLICATIONS

This Non-Provisional Patent Application claims the benefit of the filing date of U.S. Provisional Patent Application Ser. No. 62/366,716, filed Jul. 26, 2016, entitled "Freight Trailer Brake Clearing System," the entire teachings of which are incorporated herein by reference.

BACKGROUND

The present disclosure relates to systems and methods for clearing one or more brakes of a freight transport vehicle. More particularly, it relates to pneumatic air systems and methods for clearing debris, particles or moisture from mechanical components of the brakes of a freight carrier, such as a tractor trailer.

Transporting large freight over long distances is an integral part of virtually every industry. Trucks or trucking systems are commonly used to transport goods, and conventionally include a tractor and a trailer. The trailer is detachably connected the tractor, and can be a "semi-trailer" or a "full trailer". A semi-trailer is a trailer without a front axle, whereas a full trailer has both front and rear axles.

Regardless of exact form (semi-trailer or full trailer), most commercial trailers include an air brake or compressed air brake system. An on-board air storage tank provides a source of compressed air utilized to apply pressure to (or otherwise engage) the brake shoes or pads associated with each wheel of the trailer. Most truck trailer air brakes are drum brakes in which a set of shoes or pads press outwardly against a rotating cylinder-shaped brake drum. There is an increasing trend towards the use of commercial disk brakes for semi-truck and trailers in which a caliper clamps two brake pads against opposite sides of a rotating rotor (or disk). With either design, commonly-encountered environmental conditions can negatively affect brake operation.

For example, moisture (rain, snow, humidity, etc.) can accumulate between the brake shoe and brake drum (or other mechanical components of the particular brake design). In colder climates, the accumulated moisture can freeze when the trailer is not moving for even a short period of time, thereby "freezing" the brake shoe to the drum. Drivers must "unfreeze" the brake before traveling with the trailer, oftentimes resorting striking the brake with a hammer. Moreover, because brake operation is premised upon frictional interface between mechanical components, excess moisture (e.g., traveling in the rain) between these components can reduce brake effectiveness and lead to longer stopping distances. Also, road debris (e.g., sand, small rocks, road salt, etc.) invariably lodge between mechanical components of the trailer brakes, causing undesired wear and poor performance.

SUMMARY

The inventors of the present disclosure recognized that a need exists for systems and methods that address one or more of the above problems.

Some aspects of the present disclosure are directed toward a brake clearing system useful for clearing mechanical components of one or more brake units provided on a freight trailer having an air storage reservoir. The system includes a flow controller, at least one delivery hose, and at least one discharge device. The flow controller is fluidly between the air storage reservoir and the auxiliary tank. The delivery hose is fluidly connected to an outlet of the flow controller and delivers pressurized air to the discharge device. The discharge device, in turn, is configured to direct pressurized air at components of one of the brake units. In some embodiments, the flow controller includes an inflow control unit, an auxiliary tank, and an outflow control unit. In related embodiments, the inflow control unit includes one or both of a brake protection valve and a cut-off valve. The inflow control unit operates to permit or prevent flow of pressurized air from the storage reservoir. The outflow control unit is fluidly connected to an outlet of the auxiliary tank. The outflow control unit operates to selectively release pressurized air flow from the auxiliary tank to the delivery hose. In other embodiments, the system further includes a heater mounted to the auxiliary tank for heating air contained within the auxiliary tank. In yet other embodiments, the outflow control unit includes a pneumatic air timer. In further embodiments, the outflow control unit is actuated by operation of a brake pedal of a truck towing the trailer.

DETAILED DESCRIPTION

Figure 1:
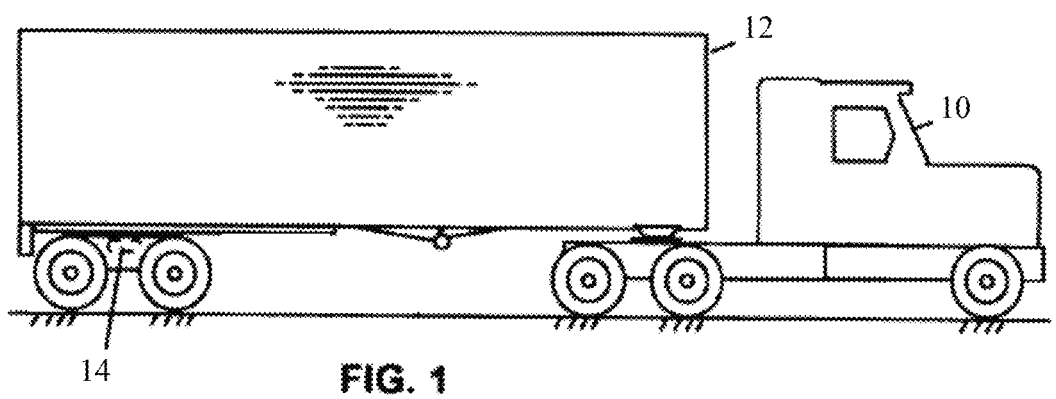
FIG. 1 is a side view of a truck in combination with a conventional trailer.

Some embodiments of the present disclosure relate to a system for clearing brakes associated with an over-the-road freight carrier, such as a semi-trailer or full trailer pulled by a tractor. To this end, FIG. 1 shows a conventional truck 10 associated with a conventional freight carrier trailer 12, and in particular a semi-trailer. An air compressor (not shown) carried by the truck 10 is driven by the truck's 10 engine (not shown) and supplies air to a pressurized air storage reservoir 14 (referenced generally in FIG. 1) mounted to an underside of the trailer 12. Although not shown in the drawings for ease of illustration, air lines pass rearwardly from the tractor compressor to the air storage reservoir 14 through a tractor protection valve to a glad hand between the tractor 10 and the trailer 14. As is known in the art, the air storage reservoir 14 is normally used to control the trailer's 12 air brake and/or air suspension systems. As further reflected by the schematic illustration of an underside of the trailer 12 in FIG. 2, the trailer further includes one or more axles 16 each mounted to two or more wheels 18. A brake unit 20 is associated with some or all of the wheels 18, and can be a drum-type brake unit (e.g., a set of shoes or pads interfacing with a cylindrical drum) or a disk-type brake unit (e.g., caliper-carried brake pads interfacing with opposing sides of a disk).

Figure 3:
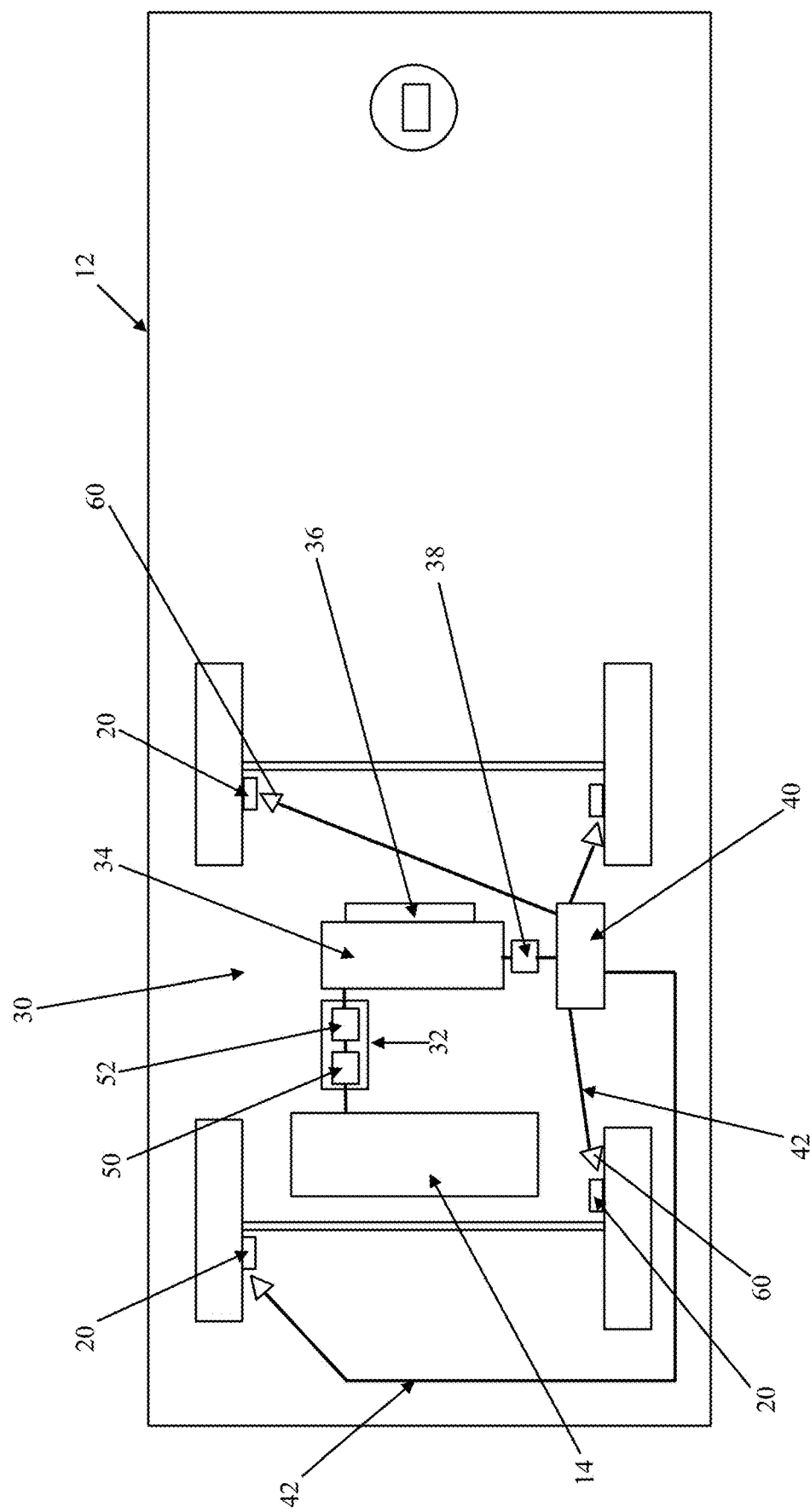
FIG. 3 is a simplified bottom view of the trailer of FIG. 2 along with a schematic illustration of a brake clearing system in accordance with principles of the present disclosure.

Against the above background, portions of a pneumatic brake clearing system 30 (referenced generally) in accordance with principles of the present disclosure are shown in simplified form in FIG. 3 as carried by an underside of the trailer 12 described above. The system 30 is configured to draw upon pressurized air from the air storage reservoir 14, and includes a flow controller, such as an inflow air control unit 32, an auxiliary air tank 34, an optional heater 36, and an outflow air control unit 38, along with an optional junction box (or manifold block) 40, and one or more delivery hoses 42. Details on the various components are provided below. In general terms, however, the auxiliary air tank 34 receives and stores pressurized air from the air storage reservoir 14 as dictated by the air control unit 32. Where provided, the heater 36 operates to periodically or continuously heat air within the air tank 34. In response to a user prompt or input, or other programmed control parameters, the outflow air control unit 38 operates to periodically release air from the auxiliary air tank 34 to the junction box 40 (where provided) and subsequently the delivery hose(s) 42. The delivery hose(s) 42 are arranged to deliver the pressurized (optionally heated) air to a corresponding one of the brake units 20, with the so-delivered pressurized air "aimed" at a desired location of the brake unit 20, such as the interface between brake shoe and brake drum. The so-delivered air thus acts to clear the brake unit 20 of moisture, debris, etc. Under circumstances with the delivered air is optionally heated, the heated air can further act to melt accumulated ice within the brake unit 20. The brake clearing systems of the present disclosure can optionally include one or more additional components; for example, the brake clearing system can include one or more sensors for detecting system pressure along with a controller electronically operating an alarm device(s) (e.g., buzzer, light, etc.) located in the truck 10 (FIG. 1) to warn an operator when the trailer's on-board pressure drops below a pre-determined value.

The inflow air control unit 32 is fluidly connected to the on-board air storage reservoir 14 and is generally configured to ensure that necessary pressure levels are maintained within the storage reservoir 14 (e.g., to ensure proper functioning of the system(s) to which the storage reservoir 14 is primarily intended to serve, such as the trailer's air brake system and/or air suspension system). In some embodiments, including those in which the storage reservoir 14 is intended to serve as the trailer's air brake system, the inflow air control unit 32 includes a brake protection valve 50 and a control valve 52. Other constructions are also envisioned.

The brake protection valve 50 controls the flow of air into the auxiliary tank 34 and out of the storage reservoir 14. Should the air pressure in the storage reservoir 14 fall below a certain level (e.g., 60 psi), the brake protection valve 50 will close, preventing passage of air from the air storage reservoir 14 to the auxiliary tank 34. This will maintain sufficient air pressure in the air storage reservoir 14 for effective breaking of the trailer 12 and the truck 10 (FIG. 1) (under circumstances where the air storage reservoir 14 is utilized to operate the trailer 12 and truck 10 air brake system). Other system shut off pressure values, such as 50 psi or 40 psi, are equally acceptable.

The control valve 52 is fluidly connected to the brake protection valve 50 in the downstream direction (relative to an air flow direction from the air storage reservoir 14), and is configured to provide user-selected open and closed states (e.g., a cut-off valve). In the open state, an interior passage of the control valve 52 is aligned with airlines to and from the control valve 52 allowing airflow to pass through. When manually transitioned to the closed state (e.g., rotation of a knob or other actuator provided with the control valve 42), the control valve 52 prevents the passage of air. Thus, at any time, an operator can manually close the control valve 52, allowing the air storage reservoir 14 to return and maintain full psi.

The auxiliary air tank 34 is fluidly connected to an outlet of the inflow control unit 32, and can assume various forms or sizes appropriate for containing a desired volume of air at a desired pressure.

Where provided, the optional heater 36 is mounted to or provided integrally with the auxiliary air tank 34. The heater 36 is generally configured to heat air contained in the auxiliary tank 34 (either directly or indirectly) to a desired, elevated temperature. The heater 36 can assume various forms, and in some embodiments is a tank heater available from Chromalox. The heater 36 can have a standalone power source (e.g., a battery), or can be electrically powered by one or more connections to the truck 10 (FIG. 1). Along these same lines, the heater 36 can have an on-board controller that regulates power and temperature settings based on pre-determined information. Alternatively or in addition, operation of the heater 36 can be controlled by an operator via a control panel (not shown) located in the truck 10 (e.g., the control panel can be electrically connected (wired or wirelessly) to the heater 36). With this construction, an operator can selected whether or not the heater 36 operates to heat the auxiliary air tank 34, a maximum temperature, etc.

The outflow air control unit 38 controls or regulates the release of air from the auxiliary tank 34, and can assume various forms. In some embodiments, the outflow air control unit 38 is or includes a pneumatic air timer (e.g., a 24 volt, Class 9050 pneumatic timer available from Schneider Electric and Square D) that is electronically linked to a use actuator. For example, the outflow air control unit 38 can be electronically linked to the brake pedal of the truck 10 (FIG. 1); with this non-limiting construction, when a driver touches the brake pedal, the outflow air control unit 38 automatically releases air from the auxiliary tank 34. Other actuators, outflow air control devices, and operational parameters are also acceptable.

The junction box 40 is fluidly connected to an outlet of the outflow air control unit 38, and provides multiple outlet ports through which air entering the junction box 40 is released. The junction box 40 can assume any form conventionally employed for dividing an incoming airstream into two or more outgoing airstreams.

Each of the delivery hoses 42 is fluidly connected to a corresponding one of the outlet ports provided by the junction box 40, and are routed to a corresponding one of the brake units 20. FIG. 3 schematically illustrates a discharge device or assembly 60 at the terminal end of each of the hoses 42. The discharge device 60 can assume various forms (e.g., air cylinder(s), nozzle(s), valve(s), etc.) configured and arranged to direct air discharged from the discharge device 60 at a desired location within the brake unit 20 (e.g., a nozzle directing pressurized air at the interface between the brake drum and shoe of the brake unit 20). While FIG. 3 generally reflects one hose 42 routed to each brake unit 20, in other embodiments, two or more hoses 42 can be provided to each of the brake units 20. In other embodiments, the discharge device 60 can be configured to direct air from a single one of the hoses 42 to two or more locations relative to one of the wheels 18. For example, some brake unit 20 constructions can include two brake shoes per wheel (one on top, one on the bottom). Two half-moon cylinders of the discharge device 60 could be commonly connected to a single hose 42 (via a T-connector); and air nozzle on each cylinder would be arranged to direct or "blast" air at a corresponding one of the brake shoes.

Figure 4:
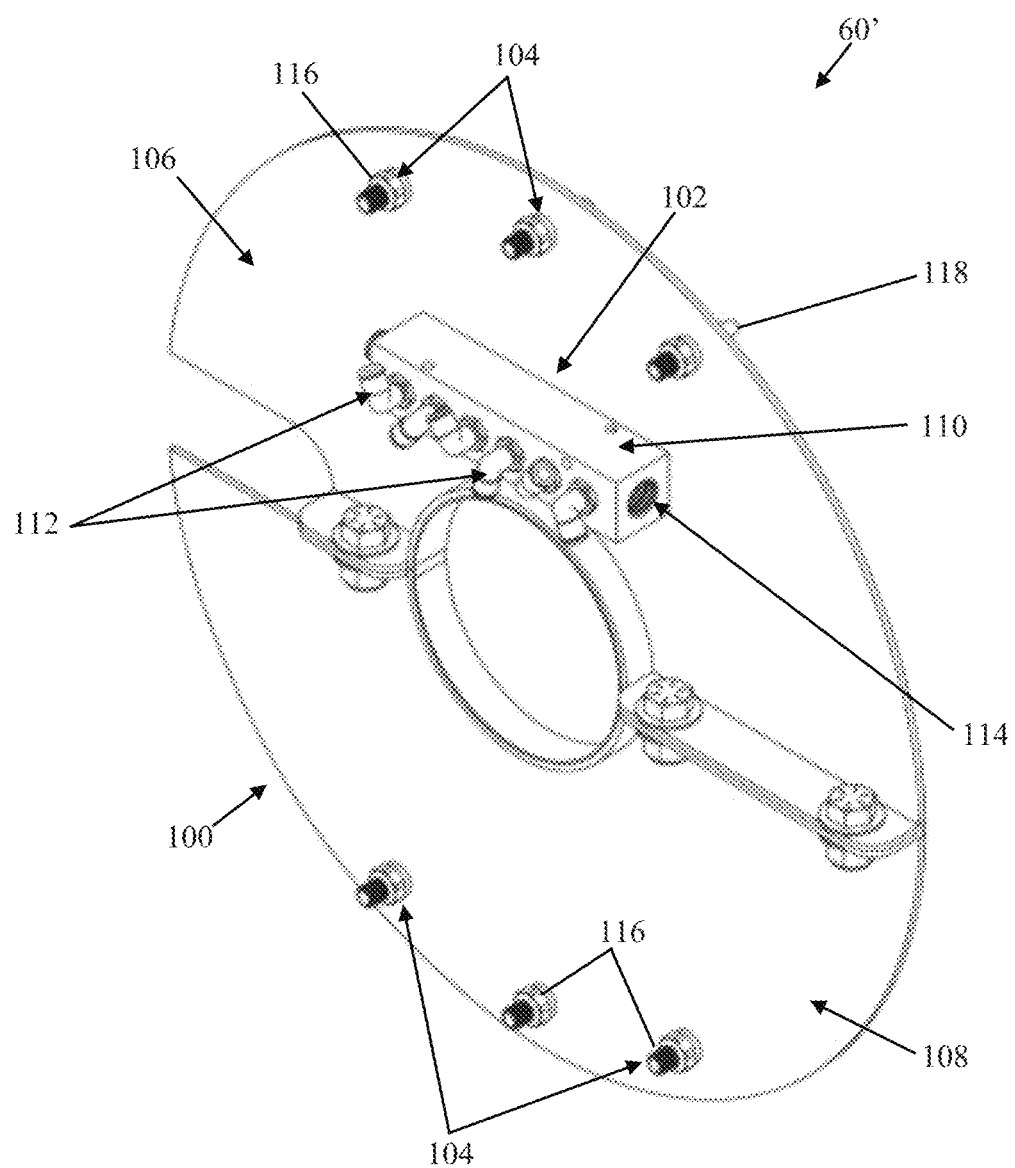
FIG. 4 is a perspective view of a discharge device useful with the brake clearing systems of the present disclosure.

Another non-limiting example of a discharge device 60' useful with the pneumatic brake clearing systems of the present disclosure is shown in FIG. 4 and includes a frame 100, a manifold assembly 102 and a plurality of nozzle assemblies 104. The frame 100 maintains the manifold assembly 102 and the nozzle assemblies 104, and is configured for mounting to an existing trailer (e.g., the trailer 12 of FIG. 1) in a close proximity to an existing brake unit (e.g., the brake units 20 of FIG. 3). For example, the frame 100 can include first and second frame sections 106, 108 configured for attachment to one another and that collectively define a ring, collar or disc shape upon final assembly. An inner diameter of the so-constructed frame 100 can be sized and shaped to be received over an axle of the trailer. The frame 100 can include one or more additional features appropriate for mounting of the frame 100 in close proximity to the brake unit 20.

The manifold assembly 102 is carried by the frame 100, and includes a manifold block 110 and a plurality of couplings 112. The manifold block 110 defines at least one inlet port 114 adapted for connection to an air delivery hose (e.g., the delivery hose 42 of FIG. 3). Further, the manifold block 110 maintains the couplings 112 (e.g., elbow couplers as shown) and provides internal channels (not shown) that route airflow received at the inlet port 114 to each of the couplings 112, respectively. In some embodiments, one or more check valves (not shown) can be carried by the manifold block 110 and operable to control delivery of air flow to one or more of the couplings 112.

Each of the nozzle assemblies 104 can include an inlet housing 116 and a nozzle body 118 (labeled for one of the nozzle assemblies 104 in FIG. 4). The inlet housing 116 is configured for attachment to the frame 100, and provides a fluid connection to the corresponding nozzle body 118. The nozzle body 118 can assumes various forms appropriate for delivering pressurized air and capable of maintaining a structural integrity under harsh operating conditions (e.g., hot or cold environments, moisture, salt, etc.).

Figure 2:
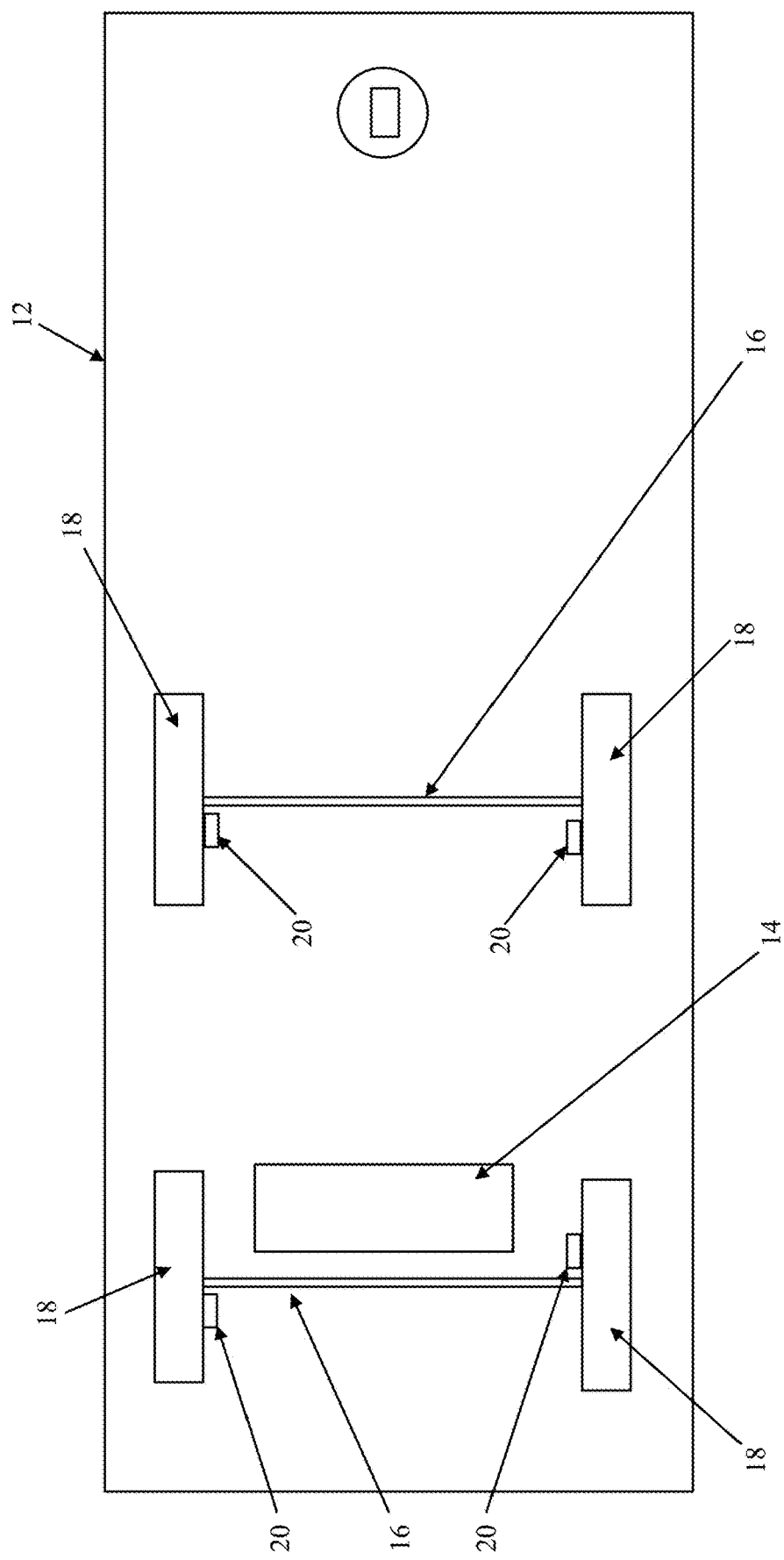
FIG. 2 is a simplified bottom view of the trailer of FIG. 1.

With the above construction, a tube or hose (not shown) fluidly connects a respective one of the couplings 112 to a corresponding one of the nozzle assemblies 104 (i.e., to the corresponding inlet housing 116). While FIG. 4 illustrates the discharge device 60' as including six of the nozzle assemblies 104, any other number, either greater or lesser, is also envisioned. Regardless, the nozzle assemblies 104 are arranged along the frame 100 such that two or more of the nozzle bodies 118 are "aimed" at different locations of the brake unit 20 (FIG. 2). For example, FIG. 4 illustrates that at least one of the nozzles assemblies 104 is maintained by the upper frame section 106 (e.g., the nozzle assembly labeled 104a), and at least another one of the nozzle assemblies 104 is maintained by the lower frame section 108 (e.g., the nozzle assembly labeled 104b). With this non-limiting construction, upon final assembly of the frame 100 relative to the brake unit 20, the nozzle bodies 118 associated with the nozzle assemblies 104 carried by the upper frame section 106 will be oriented or arranged to direct air flow at an upper component of the brake unit 20 (e.g., top brake shoe), whereas the nozzle bodies 118 of the nozzle assemblies 104 carried by the lower frame section 108 will be oriented or arranged to direct air flow at a lower component of the brake unit 20 (e.g., bottom brake shoe). Other configurations are also acceptable. For example, in other embodiments, one or more of the nozzle assemblies 104 can be installed relative to the brake unit 20 apart from the frame 100 (e.g., the frame 100 can have a half moon shape for mounting to the trailer and maintains a manifold assembly as described above; one or more nozzle assemblies are installed relative to the brake unit apart from the frame 100 and fluidly connected to the manifold assembly via a tube or hose).

Figure 5:
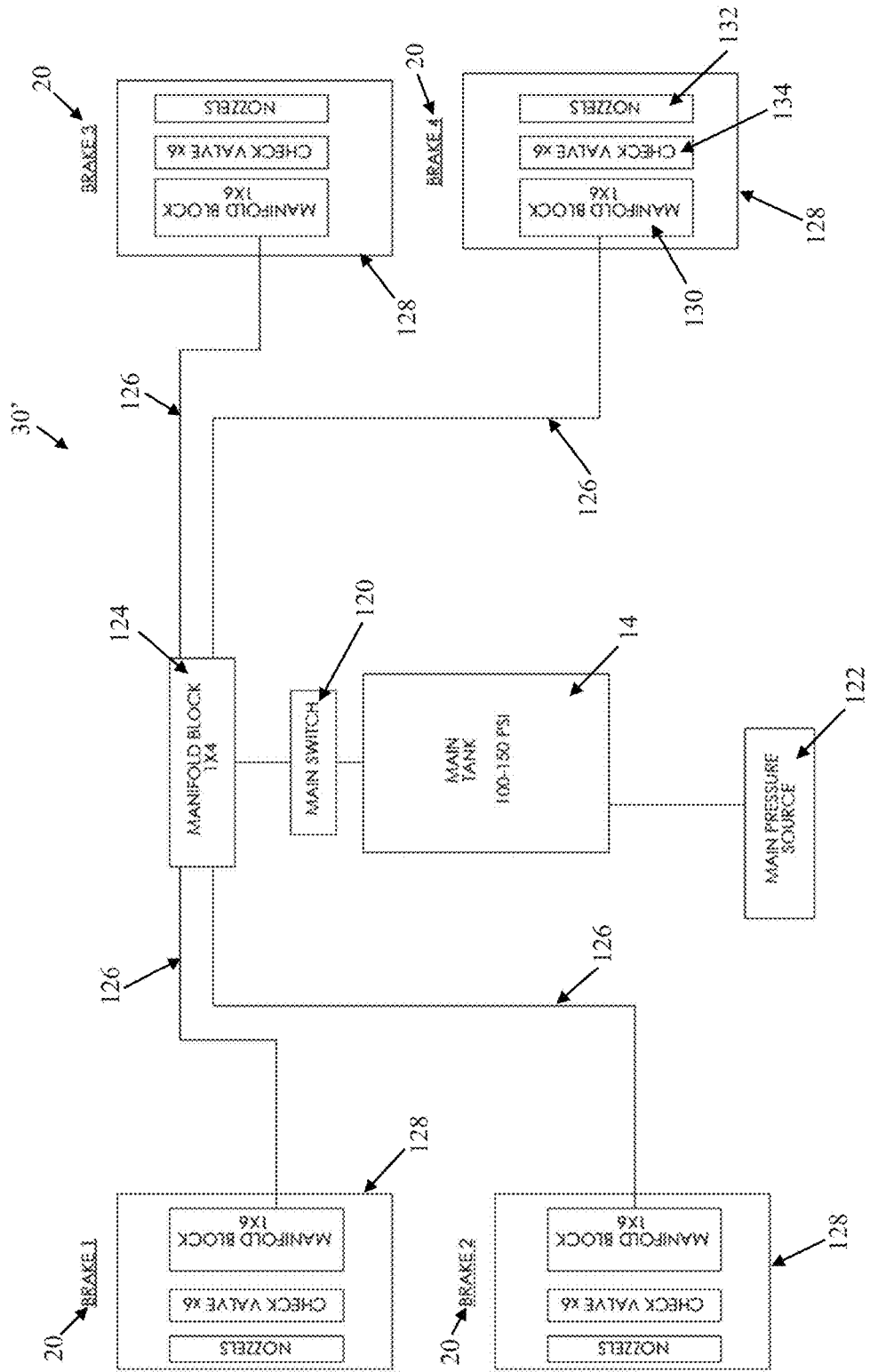
FIG. 5 schematically illustrates portions of another brake clearing system in accordance with principles of the present disclosure.

Returning to FIG. 3, the pneumatic brake clearing systems of the present disclosure can alternatively include one or more additional components apart from the components 30-42 described above. In other embodiments, one or more of the components 30-42 can assume other forms and/or can be omitted. For example, another embodiment of a brake clearing system 30' in accordance with principles of the present disclosure is schematically shown in FIG. 5. The system 30' includes a flow controller 120 (e.g., a switch) fluidly connected to the existing storage reservoir 14 (with FIG. 5 reflecting that with the existing trailer 12 (FIG. 1) will have a source of pressure 122 fluidly connected to the storage reservoir 14). The flow controller 120 is configured to control (e.g., on/off) flow of pressurized air from the storage reservoir 14 to an inlet of a manifold block (or junction box) 124. In some embodiments, the flow controller 120 can include or provide one or more of the features described above with respect to the inflow air control unit 32 (FIG. 3) and/or the outflow air control unit 38 (FIG. 3), and can further include an auxiliary tank (e.g., the auxiliary tank 34 (FIG. 3)). The manifold block 124 provides flow pathways from the inlet to two or more outlets (e.g., four outlets as reflected by FIG. 5). Delivery tubing 126 directs pressurized air from the manifold block 114 to two or more discharge devices 128 (e.g., four discharge devices as reflected by FIG. 5). The discharge devices 128 can assume any of the forms described above, with each discharge device 128 being associated with a corresponding one of the existing brake units 20. For example, in some non-limiting embodiments, each of the discharge devices 128 is configured for mounting to the existing trailer 12 (FIG. 1) and includes a manifold block 130 establishing fluid pathways to one or more nozzles 132 (e.g., six of the nozzles 132), along with a corresponding number of check valves 134.

In more general terms, the pneumatic brake clearing systems of the present disclosure are configured to tap into the essentially continuous supply of pressurized air provided by the air storage reservoir already present on most heavy load, commercial trailers (semi-trailers and full trailers). Necessary minimum air pressure of the air storage reservoir is always maintained. Airflow drawn from the air storage reservoir is directed, at high pressures, at brake unit components, thereby cleaning the brake unit of road debris such as sand, small rocks and road salt. The "blasted" air can further remove or dry accumulate moisture under wet conditions, serving to dry the brake unit and improve stopping distance. The supplied air can further assist in cooling a brake unit. Where the blasted air is heated, ice or other frozen conditions within a brake unit experience melting, serving to prevent freezing or "unfreeze" a brake unit. In some embodiments, the pneumatic brake clearing systems of the present disclosure are configured or programmed to direct pressurized air on to the brake units each time an operator touches the brake pedal.

Although the present disclosure has been described with reference to preferred embodiments, workers skilled in the art will recognize that changes can be made in form and detail without departing from the spirit and scope of the present disclosure.

What is claimed is:

1. A brake clearing system for clearing one or more brake units associated with a freight carrier trailer, the trailer including a compressed air storage reservoir coupled to an underside thereof, the system comprising:
a flow controller fluidly connected to the air storage reservoir, the flow controller comprising:
an inflow control unit fluidly coupled to the air storage reservoir,
an auxiliary tank fluidly connected to an outlet of the inflow control unit, and
an outflow control unit fluidly connected an outlet of the auxiliary tank;
a tank heater connected to the auxiliary tank such that when activated, the tank heater heats air contained in the auxiliary tank;
a first delivery hose fluidly connected to an outlet of the flow controller, wherein an inlet of the first delivery hose is fluidly connected to the outflow control unit;
a first discharge device fluidly connected to an outlet of the first delivery hose and configured to direct pressurized air at components of one of the brake units;
wherein the system is configured such that the flow controller selectively permits air flow to the first delivery hose.

2. The brake clearing system of claim 1, wherein the flow controller includes a switch.

3. The system of claim 1, further comprising a second delivery hose and a junction box fluidly between the auxiliary tank and the first and second delivery hoses.

4. The system of claim 1, wherein the inflow control unit includes a brake protection valve.

5. The system of claim 4, wherein the inflow control unit further includes a control valve.

6. The system of claim 1, wherein the outflow control unit includes a pneumatic air timer.

7. The system of claim 1, further comprising an electrical connection between the outflow control unit and a brake pedal of a truck towing the trailer.

8. The system of claim 1, further comprising:
a second delivery hose fluidly connected to an outlet of the flow controller; and
a second discharge device fluidly connected to an outlet of the second delivery hose and configured to direct pressurized air at components of another one of the brake units.

9. The system of claim 1, wherein the first discharge device comprises:
a frame;
a manifold assembly carried by the frame, the manifold assembly including a manifold block and a plurality of couplings; and
a plurality of nozzles fluidly connected to corresponding ones of the couplings.

10. The system of claim 9, wherein the plurality of nozzles includes first and second nozzles, and further wherein a spray direction established by the first nozzle differs from a spray direction established by the second nozzle.

11. The system of claim 9, wherein the plurality of nozzles are attached to the frame.

12. The system of claim 9, wherein the first discharge device further comprises a plurality of check valves, and further wherein respective ones of the plurality of check valves are fluidly associated with a corresponding one of the plurality of nozzles.

13. The system of claim 9, wherein the frame includes first and second frame sections collectively define a ring shape.

14. A brake clearing system for clearing one or more brake units associated with a freight carrier trailer, the trailer including an axle and a compressed air storage reservoir coupled to an underside of the trailer, the system comprising:
a flow controller fluidly connected to the air storage reservoir;
a first delivery hose fluidly connected to an outlet of the flow controller;
a first discharge device fluidly connected to an outlet of the first delivery hose and configured to direct pressurized air at components of one of the brake units, wherein the first discharge device comprises:
a frame, wherein the frame has a ring shape, configured to be received over the axle,
a manifold assembly carried by the frame, the manifold assembly including a manifold block and a plurality of couplings, and
a plurality of nozzles fluidly connected to corresponding ones of the couplings;
wherein the system is configured such that the flow controller selectively permits air flow to the first delivery hose.

15. The system of claim 14, wherein the plurality of nozzles includes first and second nozzles, and further wherein a spray direction established by the first nozzle differs from a spray direction established by the second nozzle.

16. The system of claim 14, further comprising an auxiliary tank fluidly between the air storage reservoir and the first delivery hose.

17. The system of claim 16, further comprising a tank heater connected to the auxiliary tank.

18. The system of claim 14, further comprising:
a second delivery hose fluidly connected to an outlet of the flow controller; and
a second discharge device fluidly connected to an outlet of the second delivery hose and configured to direct pressurized air at components of another one of the brake units.

19. The system of claim 9, wherein the brake unit includes a top brake shoe and a bottom brake shoe, and further wherein the first discharge device is configured such that upon assembly to the trailer, a first nozzle of the plurality of nozzles is arranged to direct air flow at the top brake shoe and a second nozzle of the plurality of nozzles is arranged to direct air flow at the bottom brake shoe.

* * * * *